(12) United States Patent
Bugby et al.

(10) Patent No.: US 9,146,058 B2
(45) Date of Patent: Sep. 29, 2015

(54) TWO-PHASE HEAT TRANSFER SYSTEM INCLUDING A THERMAL CAPACITANCE DEVICE

(75) Inventors: David C. Bugby, Vienna, VA (US);
Edward J. Kroliczek, Davidsonville, MD (US); Jessica Maria Kester, Ellicott City, MD (US)

(73) Assignee: ORBITAL ATK, INC., Dulles, VA (US)

( * ) Notice: Subject to any disclaimer, the term of this patent is extended or adjusted under 35 U.S.C. 154(b) by 1031 days.

(21) Appl. No.: 13/022,445

(22) Filed: Feb. 7, 2011

(65) Prior Publication Data

US 2011/0132576 A1 Jun. 9, 2011

Related U.S. Application Data

(62) Division of application No. 11/359,766, filed on Feb. 23, 2006, now Pat. No. 7,882,888.

(60) Provisional application No. 60/655,485, filed on Feb. 23, 2005.

(51) Int. Cl.
*F28D 15/00* (2006.01)
*F28D 15/04* (2006.01)
*F28D 1/047* (2006.01)
*F28D 20/00* (2006.01)
*F28D 19/04* (2006.01)
(Continued)

(52) U.S. Cl.
CPC ............ *F28D 15/043* (2013.01); *F28D 1/0477* (2013.01); *F28D 20/00* (2013.01); *F28D 15/0266* (2013.01); *F28D 19/042* (2013.01); *F28D 2020/0013* (2013.01); *F28F 2013/006* (2013.01); *Y02E 60/142* (2013.01); *Y02E 60/145* (2013.01)

(58) Field of Classification Search
CPC . F28D 15/025; F28D 15/046; F28D 15/0266; F28D 15/0275; F28D 19/044; F28D 20/02; F28D 20/021; F28D 20/025; F28D 2015/0225; Y02E 60/145
USPC ...................... 165/10, 104.14, 104.21, 104.26
See application file for complete search history.

(56) References Cited

U.S. PATENT DOCUMENTS 3,613,778 A * 10/1971 Feldman, Jr. ............ 165/104.26
3,735,806 A * 5/1973 Kirkpatrick .............. 165/104.26
(Continued)

OTHER PUBLICATIONS

S-Bond™ Wetting/Mechanical Activation, S-Bond® Technologies, LLC, Technical Bulletin No. SBT T14.2.1.9, prior to Feb. 23, 2005 (1 page).

(Continued)

*Primary Examiner* — Ljiljana Ciric
(74) *Attorney, Agent, or Firm* — TraskBritt

(57) ABSTRACT

A two-phase heat transfer system includes an evaporator unit configured to receive heat from a source, a liquid line fluidly connected to the evaporator unit, a vapor line fluidly connected to the evaporator unit, and a condenser. The condensing unit includes a thermal capacitance device and a condenser integrated with the thermal capacitance device. Methods of forming a thermal storage unit include preparing a honeycomb core to receive a phase change material, metallurgically bonding end pieces to the core, to thermally link the end pieces to the core, and bonding the end pieces together to form a seal for holding the phase change material within the core.

18 Claims, 16 Drawing Sheets

(51) Int. Cl.
*F28D 15/02* (2006.01)
*F28F 13/00* (2006.01)

(56) References Cited

U.S. PATENT DOCUMENTS

| | | | |
|---|---|---|---|
| 3,749,156 A * | 7/1973 | Fletcher et al. | 165/104.26 |
| 3,948,316 A * | 4/1976 | Souriau | 165/104.26 |
| 3,948,317 A * | 4/1976 | Moore | 165/10 |
| 3,965,695 A * | 6/1976 | Rush et al. | 165/10 |
| 3,982,981 A * | 9/1976 | Takao et al. | 165/10 |
| 4,131,158 A | 12/1978 | Abhat et al. | |
| 4,202,660 A * | 5/1980 | Pei | 165/10 |
| 4,335,781 A * | 6/1982 | Duffy | 165/104.21 |
| 4,335,783 A * | 6/1982 | McBrayer et al. | 165/10 |
| 4,489,774 A * | 12/1984 | Ogawa et al. | 165/10 |
| 4,513,807 A * | 4/1985 | Rose et al. | 165/10 |
| 4,527,545 A * | 7/1985 | Bertels | 165/104.21 |
| 4,546,817 A * | 10/1985 | Wieland | 165/10 |
| 4,594,860 A * | 6/1986 | Coellner et al. | 165/10 |
| 4,645,700 A * | 2/1987 | Matsuhisa et al. | 165/10 |
| 4,781,243 A * | 11/1988 | DeVogel et al. | 165/10 |
| 4,807,696 A | 2/1989 | Colvin et al. | |
| 4,830,097 A * | 5/1989 | Tanzer | 165/104.26 |
| 4,832,999 A * | 5/1989 | Sweet | 165/10 |
| 4,877,670 A * | 10/1989 | Hamanaka | 165/10 |
| 4,976,308 A | 12/1990 | Faghri | |
| 4,993,481 A | 2/1991 | Kamimoto et al. | |
| 5,195,575 A | 3/1993 | Wylie | |
| 5,228,504 A | 7/1993 | Mantegazza et al. | |
| 5,255,526 A | 10/1993 | Fischer | |
| 5,270,550 A * | 12/1993 | Martorana et al. | 165/10 |
| 5,305,821 A * | 4/1994 | Weingartner | 165/10 |
| 5,647,225 A | 7/1997 | Fischer et al. | |
| 5,682,943 A * | 11/1997 | Yao et al. | 165/104.21 |
| 5,725,049 A | 3/1998 | Swanson et al. | |
| 5,727,619 A * | 3/1998 | Yao et al. | 165/104.21 |
| 5,871,043 A * | 2/1999 | Osakabe et al. | 165/104.21 |
| 5,992,504 A * | 11/1999 | Kumazawa et al. | 165/10 |
| 6,003,591 A * | 12/1999 | Campbell | 165/104.26 |
| 6,047,876 A | 4/2000 | Smith | |
| 6,231,693 B1 | 5/2001 | Lugscheider et al. | |
| 6,264,095 B1 | 7/2001 | Stouffer et al. | |
| 6,367,683 B1 | 4/2002 | Rass et al. | |
| 6,631,755 B1 | 10/2003 | Kung et al. | |
| 6,889,754 B2 | 5/2005 | Kroliczek et al. | |
| 6,892,798 B2 | 5/2005 | Lee et al. | |
| 6,915,843 B2 | 7/2005 | Kroliczek et al. | |
| 6,957,692 B1 * | 10/2005 | Win-Haw et al. | 165/104.21 |
| 7,035,532 B2 * | 4/2006 | Kudo | 165/10 |
| 7,051,793 B1 * | 5/2006 | Schulz-Harder | 165/104.26 |
| 7,159,643 B2 * | 1/2007 | Kudo | 165/10 |
| 7,163,121 B1 | 1/2007 | Stouffer et al. | |
| 7,191,820 B2 | 3/2007 | Chou et al. | |
| 7,882,888 B1 * | 2/2011 | Bugby et al. | 165/10 |
| 8,205,642 B2 * | 6/2012 | Straza | 165/10 |
| 2005/0061487 A1 | 3/2005 | Kroliczek et al. | |
| 2012/0208142 A1 * | 8/2012 | Zhou | 432/214 |
| 2012/0266553 A1 * | 10/2012 | Shiao et al. | 52/232 |

OTHER PUBLICATIONS

S-Bond® 220 Active Solder Joining of metals, S-Bond Technologies, LLC, SBT Copyright 2002, Product Bulletin No. P14.2.1.1 (1 page).
S-Bond® 220 Active Solder Joining of Ceramics, S-Bond Technologies, LLC, SBT Copyright 2002, Product Bulletin No. P14.2.1.2 (1 page).
S-Bond™ 220 Joining Applications, S-Bond® Technologies, LLC, SBT Copyright 2002, Application Bulletin No. SBT A14.2.1.3 (5 pages).
S-Bond® Joining Graphite Foams, S-Bond Technologies, LLC, SBT Copyright 2002, Application Bulletin No. A14.2.1.12 (2 pages).
S-Bond® Joining Thermal Management, S-Bond Technologies, LLC, SBT Copyright 2002, Application Bulletin No. A14.2.1.11 (2 pages).
S-Bond™ Supplemental Solder Joining, S-Bond® Technologies, LLC, Technical bulletin No. SBT T14.2.1.10, prior to Feb. 23, 2005 (1 page).
S-Bond™ Joining Technology Brief, S-Bond Technologies, LLC, SBT Copyright 2002, Technical Bulletin No. T14.2.1.4 (1 page).
S-Bond™ Joining Procedures for Graphite Foams, S-Bond Technologies, LLC, SBT Copyright 2002, Technical Bulletin No. SBT T14.2.1.11 (2 pages).

* cited by examiner

TWO-PHASE HEAT TRANSFER SYSTEM INCLUDING A THERMAL CAPACITANCE DEVICE

CROSS-REFERENCE TO RELATED APPLICATIONS

This application is a divisional of U.S. patent application Ser. No. 11/359,766, filed Feb. 23, 2006, now U.S. Pat. No 7,882,888, issued Feb. 8, 2011, which claims the benefit of U.S. Provisional Application No. 60/655,485, filed Feb. 23, 2005, the disclosure of each of which is hereby incorporated herein in its entirety by this reference.

TECHNICAL FIELD

This description relates to a two-phase heat transfer system including a thermal capitance device.

BACKGROUND

Heat transfer systems are used to transport heat from one location (the heat source) to another location (the heat sink). Heat transfer systems can be used in terrestrial or non-terrestrial applications. For example, heat transfer systems can be used in electronic equipment, which often require cooling during operation. Heat transfer systems can also be used in, and integrated with satellite equipment that operates within zero or low-gravity environments.

Loop Heat Pipes (LHPs) and Capillary Pumped Loops (CPLs) are examples of passive two-phase loop heat transfer systems. Each includes an evaporator thermally coupled to the heat source, a condenser thermally coupled to the heat sink, fluid that flows between the evaporator and the condenser, and a fluid reservoir for heat transfer system temperature control and for accommodating redistribution or volume changes of the fluid. The fluid within the heat transfer system can be referred to as the working fluid. The evaporator includes a primary wick and a core that includes a fluid flow passage. Heat acquired by the evaporator is transported to and rejected by the condenser. These systems utilize capillary pressure developed in a fine-pored wick within the evaporator to promote circulation of working fluid from the evaporator to the condenser and back to the evaporator.

SUMMARY

In one general aspect, a two-phase heat transfer system includes an evaporator configured to receive heat from a source, a liquid line fluidly connected to the evaporator, a vapor line fluidly connected to the evaporator, and a condensing unit. The condensing unit includes a thermal capacitance device and a condenser thermally integrated with a condenser side of the thermal capacitance device. The condenser includes a vapor inlet fluidly connected to the vapor line and a liquid outlet fluidly connected to the liquid line.

Implementations may include one or more of the following aspects. For example, the condensing unit may include a heat sink thermally connected to a heat sink side of the condenser. The thermal capacitance device may include a thermal storage unit. The thermal storage unit may include a core that defines channels for receiving a phase change material. The thermal storage unit may include an end piece that surrounds a core filled with phase change material. The condenser may include a condenser line that is thermally attached to an outer surface of the end piece. The condenser may include a condenser line that is defined within holes of the end piece, and the holes may be fluidly connected to the vapor inlet and the liquid outlet of the condenser. The thermal storage unit may include a metallurgical bond between the core and the end piece. The thermal capacitance device may define holes of the condenser that are fluidly connected to the vapor inlet and the liquid outlet.

In another general aspect, a two-phase heat transfer system includes a condenser configured to condense vapor, a liquid line fluidly connected to the condenser, a vapor line fluidly connected to the condenser, and an evaporating unit. The evaporating unit includes an evaporator fluidly connected to the liquid line and to the vapor line and configured to receive heat from a heat source. The evaporating unit includes a thermal capacitance device integrated with the evaporator.

Implementations may include one or more of the following aspects. For example, the thermal capacitance device may include a thermal storage unit. The thermal storage unit may include a block that defines channels for receiving a phase change material. The block may surround the evaporator. The channels may feed into a plenum that is fluidly coupled to each of the channels. The thermal storage unit may include end caps that seal to the block to maintain the phase change material within the channels and the plenum. The thermal capacitance device may surround the evaporator.

In another general aspect, a method of forming a thermal storage unit includes preparing a honeycomb core to receive a phase change material, metallurgically bonding both end pieces to the core to thermally link the end pieces to the core, and bonding the end pieces together to form a seal for holding the phase change material within the core.

Implementations may include one or more of the following aspects. For example, metallurgically bonding both end pieces to the core may include metallurgically bonding one end piece to the core simultaneously with metallurgically bonding the other end piece to the core. Bonding the end pieces together may include mating peripheral flanges on the end pieces together using a seal weld. Bonding the end pieces together may include fastening the peripheral flanges together at a thick walled section around a periphery of the end pieces.

Metallurgically bonding the end pieces to the core may include mating the core and the end pieces, applying a solder to mating surfaces of the end pieces and/or the core, and heating the core, the end pieces, or the core and the end pieces to melt the solder to bond the end pieces to the core. The method may include cooling the end pieces and the core after heating.

Metallurgically bonding the end pieces to the core may include bonding without the use of a flux. Metallurgically bonding the end pieces to the core may include bonding without the use of a surface treatment on the end pieces or the core.

The method may include filling the core with the phase change material.

Other features and advantages will be apparent from the description, the drawings, and the claims.

DESCRIPTION OF DRAWINGS

Like reference symbols in the various drawings indicate like elements.

DETAILED DESCRIPTION

Figure 1:
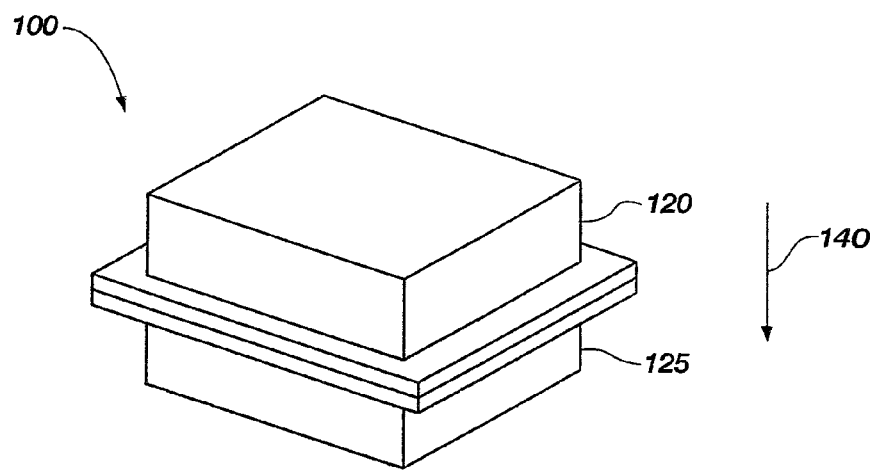
FIG. 1 is a perspective view of a thermal storage unit.
Figure 2:
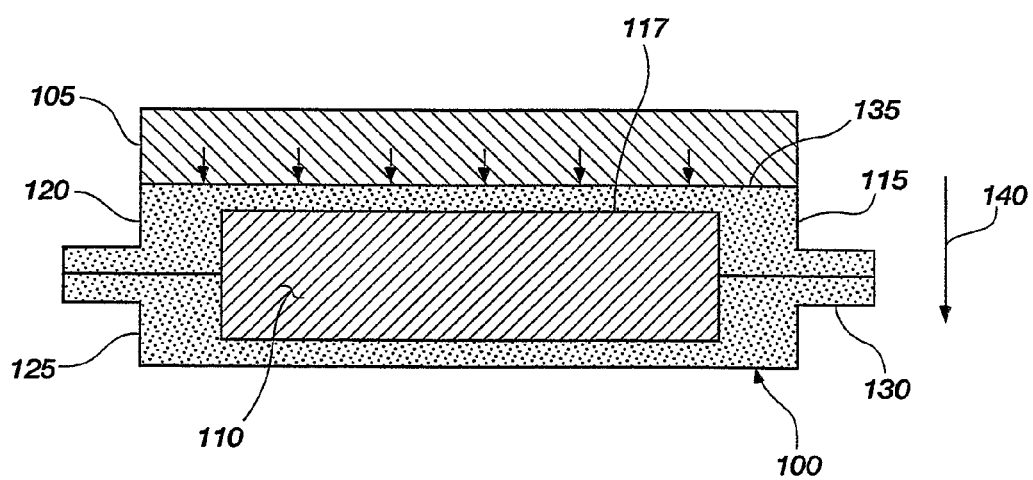
FIG. 2 is a cross-sectional view of a temperature-sensitive system thermally coupled to the thermal storage unit of FIG. 1.

A thermal capacitance device is designed to reduce or minimize the temperature fluctuations of a temperature-sensitive system that is subjected to temporally varying heat loads. The temperature-sensitive system can be a single component or a group of interrelated components. Referring to FIGS. 1 and 2, the thermal capacitance device may be a thermal storage unit (TSU) 100 that reduces or minimizes temperature fluctuations of a temperature-sensitive system 105 in a passive manner. As shown, the TSU 100 is a "latent heat" or isothermal TSU that changes phase to store heat. The latent heat TSU 100 is designed as a sealed vessel having a thermally conductive porous core 110 and a shell 115 surrounding the core 110 and defining a void volume that houses the core 110. The shell 115 and the core 110 are bonded at an interface 117. The void volume in the core 110 is partially to nearly fully filled with a phase change material (PCM) that melts near an operating temperature of the system 105.

The shell 115 is made of two pieces 120, 125 that mate at an interface 130 to form a hermetic seal for housing the PCM. The shell 115 is made of a thermally conductive material to enable transfer of heat from the system 105 to the TSU 100. The system 105 and the TSU 100 are thermally mated at interface 135 between the piece 120 and the system 105. The interface 135 is typically a flat interface and mating between the piece 120 and the system 105 may occur, for example, through bolting, gluing (such as with epoxy), clamping, welding, brazing, soldering, or diffusion bonding. A diffusion bonding process is described in U.S. Application Ser. No. 09/434,507, filed Nov. 5, 1999, now U.S. Patent No. 7,163,121, issued Jan. 16, 2007, which is incorporated herein by reference in its entirety.

The design and performance of the TSU 100 is dependent on an energy storage capacity (E) and an allowable temperature change ($\Delta T$) of the system 105. Moreover, the two parameters E and $\Delta T$ may be affected by a relative density (or volume fraction) of the core 110; a linear dimension (or length) of the core 110, where the linear dimension is parallel to a principal direction 140 of heat flow; a lateral dimension (or area) of the core 110, where the lateral dimension is perpendicular to the principal direction 140 of heat flow; and thermo-physical properties of the core 110 and the PCM within the core 110. Moreover, the surface area-to-volume ratio of the core 110 can impact the design of the TSU 100. In one implementation, this ratio is set high enough to ensure that the thermal resistance for heat flow into and out of the PCM can be neglected.

Figure 3A:
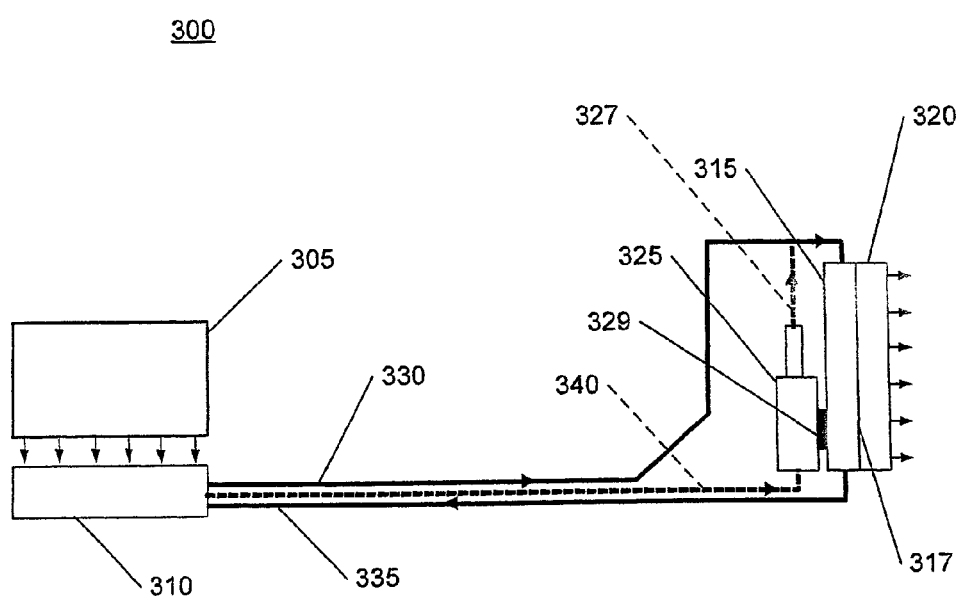
FIG. 3A is a schematic diagram of a two-phase heat transfer system.

Referring to FIG. 3A, a two-phase heat transfer system 300 thermally transports heat from a heat source 305 using the capillary pressure developed in a wick of a fine pore evaporator 310 to circulate a working fluid within a closed loop. The heat transfer system 300 includes a condenser 315, a cooling sink 320 thermally coupled to the condenser 315 at an interface 317, a fluid reservoir 325, a vapor line 330 from the evaporator 310 to the condenser 315, a liquid line 335 from the condenser 315 to the evaporator 310, and a sweepage line 340 from the evaporator 310 to the reservoir 325. The fluid reservoir 325 may be cold biased by a thermal connection 329 with the condenser 315. Additionally, the fluid reservoir 325 is in fluid communication with the vapor line 330 by way of a reservoir line 327.

Figure 3B:
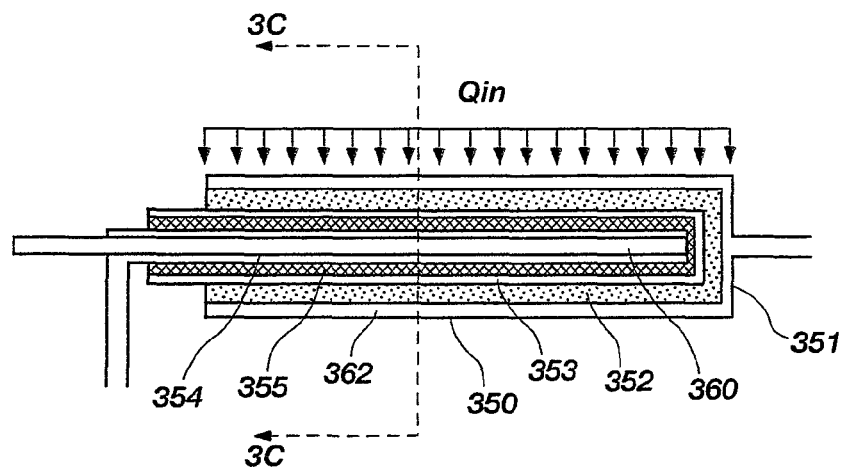
FIG. 3B is a side cross-sectional view of a cylindrical evaporator that can be used in the heat transfer system of FIG. 3A.
Figure 3C:
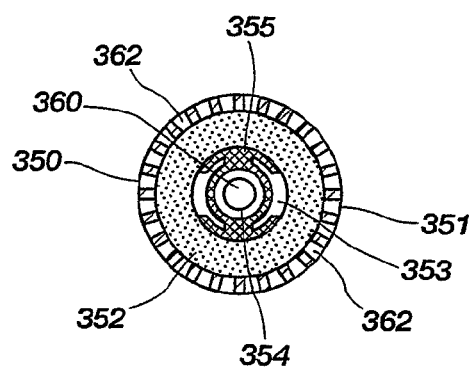
FIG. 3C is a cross-sectional view of the evaporator of FIG. 3B taken along section line 3C-3C.
Figure 3D:
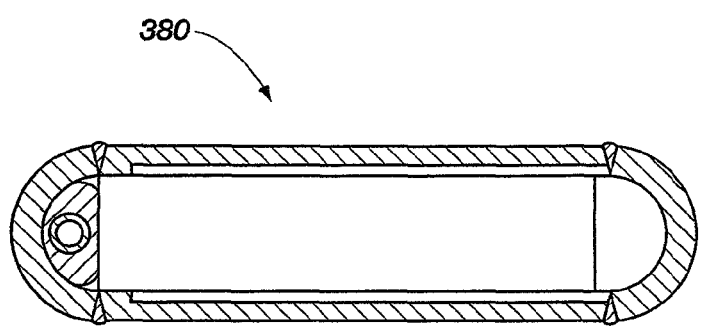
FIG. 3D is a cross-sectional view of a flat evaporator that can be used in the heat transfer system of FIG. 3A.

The cooling sink 320 is typically thermally coupled to the condenser 315 by mounting the cooling sink 320 to a side of the condenser 315 to ensure an efficient transfer of heat at the interface 317 between the condenser 315 and the cooling sink 320. The evaporator 310 may be any design or shape suitable for thermally coupling to the heat source 305. Referring to FIGS. 3B and 3C, for example, the evaporator 310 can be a cylindrical evaporator 350. In this case, the evaporator 350 includes a container 351 that houses a primary wick 352, within which a core 353 is defined. The evaporator 350 may optionally include a bayonet tube 354 and a secondary wick 355 within the core 353 and surrounding the bayonet tube 354. The bayonet tube 354, the primary wick 352, and the secondary wick 355 define a liquid passage 360 and a vapor passage 362. The secondary wick 355 provides phase control, that is, liquid/vapor separation in the core 353, as discussed in U.S. Pat. No. 6,889,754, issued May 10, 2005, which is incorporated herein by reference in its entirety. Referring to FIG. 3D, as another example, the evaporator 310 can be a flat plate evaporator 380, as described in U.S. Pat. No. 6,915,843, issued Jul. 12, 2005, which is incorporated herein by reference in its entirety.

In operation, heat is acquired from the heat source 305 through evaporation within the wick of the evaporator 310, vapor from the evaporator 310 flows out of the evaporator 310 through the internal vapor passage 362 and through the vapor line 330 to the condenser 315, where the heat is rejected through condensation of the vapor into condensed liquid. The condensed liquid flows through the liquid line 335 and into the liquid passage 360 of the evaporator 310 to feed the wick of the evaporator 310, where it is available for evaporation. Moreover, vapor and/or bubbles of non-condensable gas (NCG bubbles) are vented from a core of the evaporator 310 through the sweepage line 340 and into the reservoir 325.

Additionally, fluid, from the reservoir 325 can be drawn into the condenser 315 through the reservoir line 327.

Two-phase heat transfer systems have no moving parts and are passive (and are, therefore, generally reliable). They can be used for various applications including spacecraft thermal control. For example, spacecraft waste heat may be transported by a two-phase heat transfer system to its condenser (a space-facing radiator). Two-phase heat transfer systems can be miniaturized and can be utilized to cool a variety of heat dissipating components including components that operate at cryogenic temperatures.

The two-phase heat transfer system 300 is formed by thermally attaching the evaporator 310 to the heat source 305, routing the fluid lines 330, 335 from the evaporator 310 to the condenser 315, thermally attaching the condenser 315 to the cooling sink 320, and controlling the temperature of the reservoir 325 for variable loop conductance and temperature stability of the heat source 305. The condenser 315 may include either a single channel or multiple-parallel channels that are made of smooth-walled tubing. The size, the length, and the number of channels affect the heat transfer area and the pressure drop. As the cross-sectional area of a channel is reduced, the condensation film coefficient increases (reducing the required condenser area) but the pressure drop also increases. Increasing the number of channels or making the channels shorter can offset this pressure drop, but manufacturing limitations may arise as the channel size is reduced and more complex methods are needed.

Figure 4:
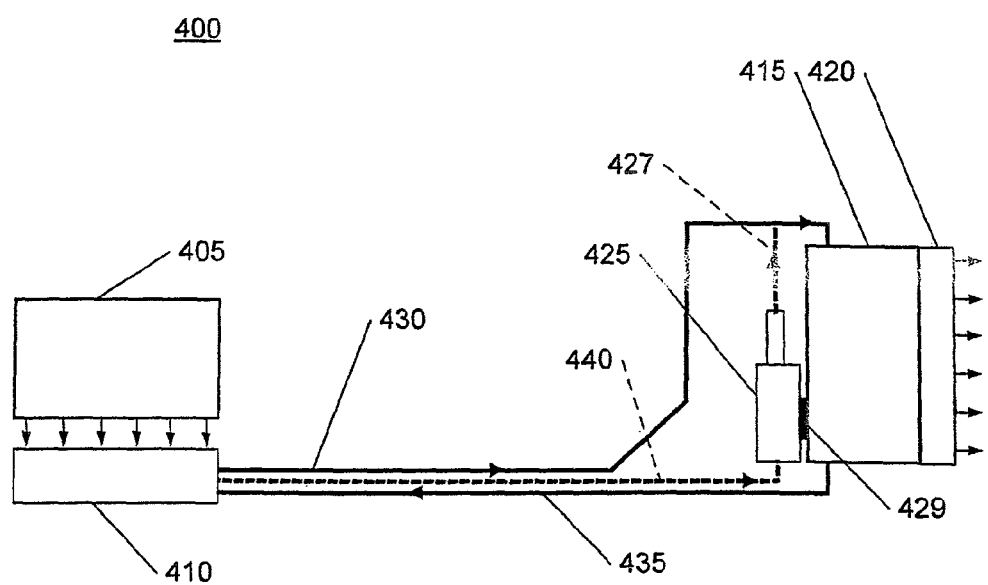
FIG. 4 is a schematic diagram of a two-phase heat transfer system including a thermal capacitance condensing unit.
Figure 5:
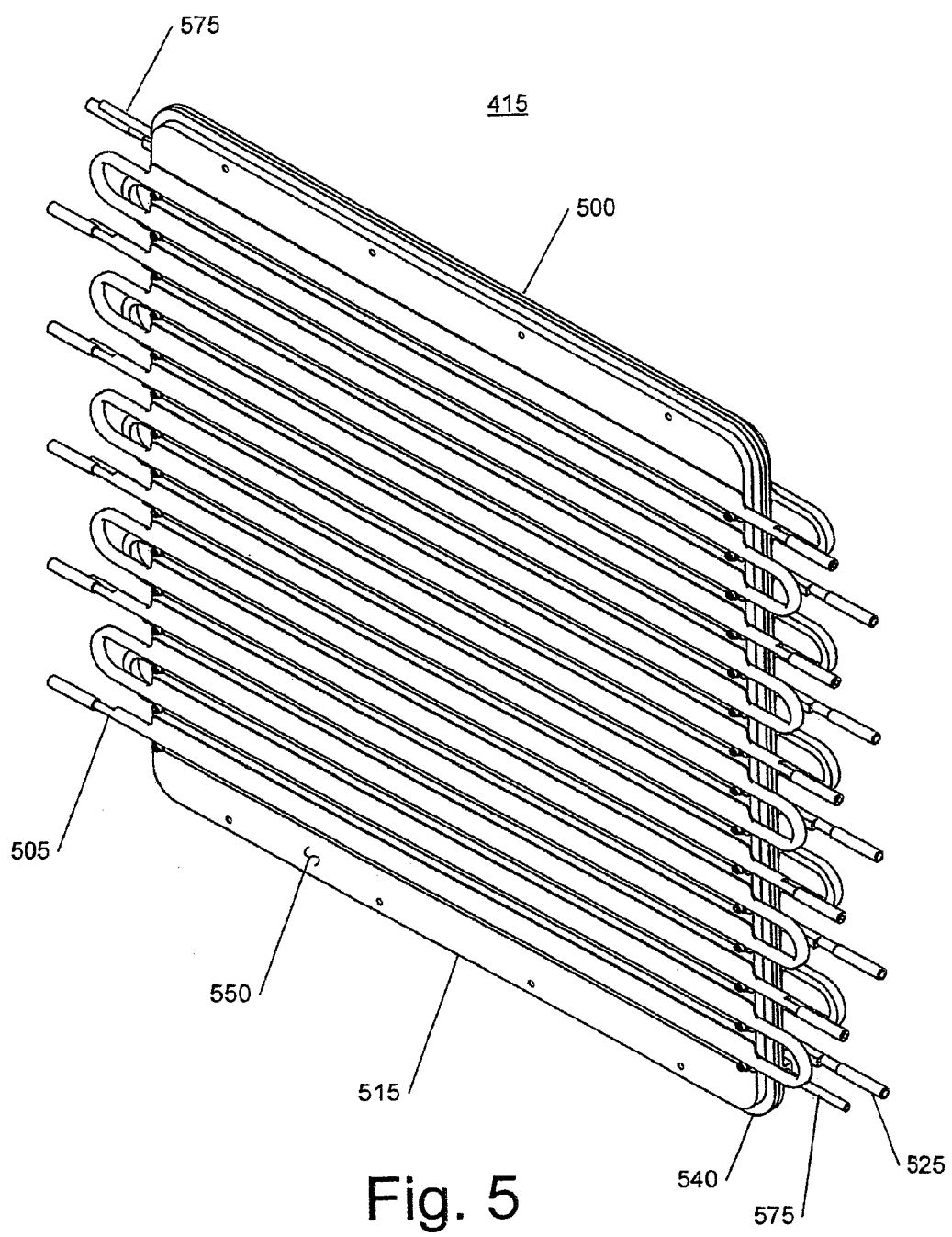
FIG. 5 is a perspective view of the condensing unit of FIG. 4.
Figure 6:
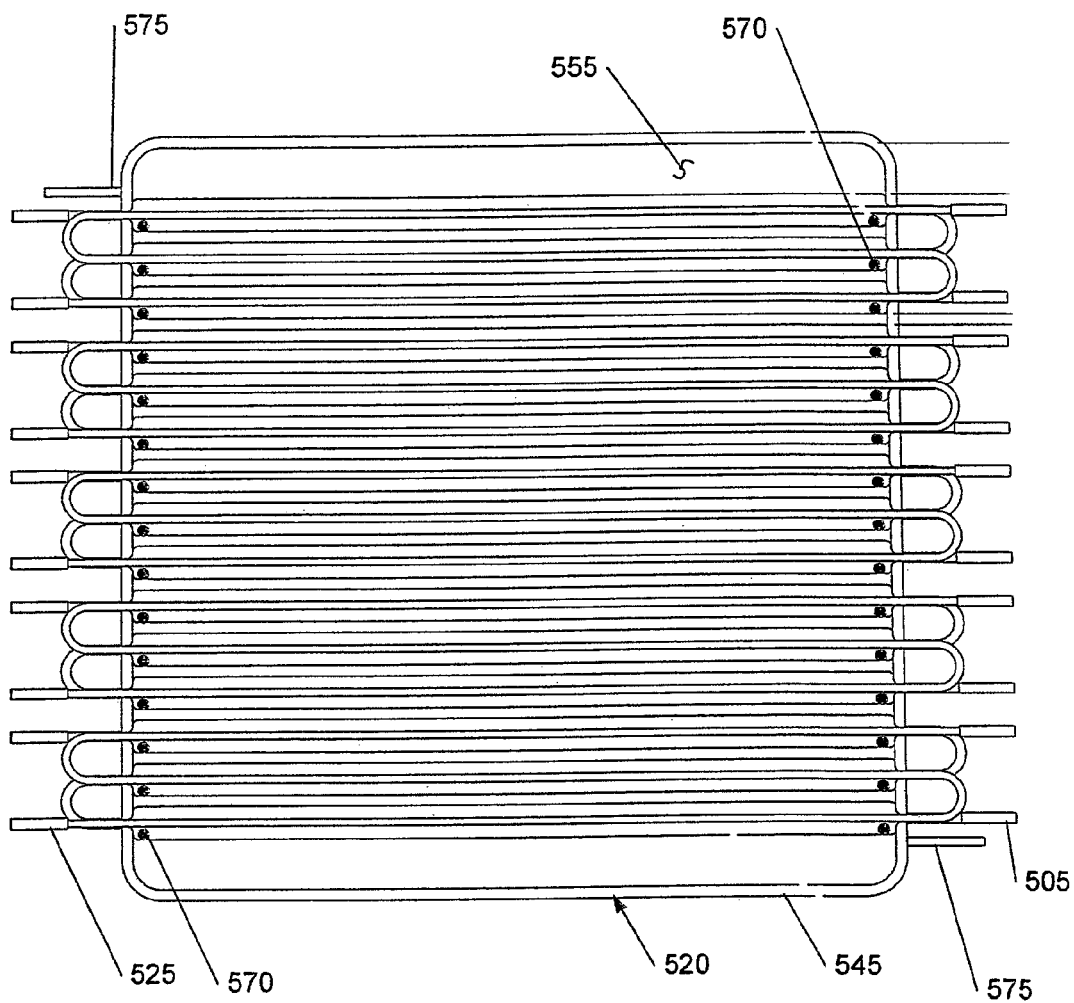
FIG. 6 is a side plan view of the condensing unit of FIG. 5 showing the side that receives the cooling sink.
Figure 7:
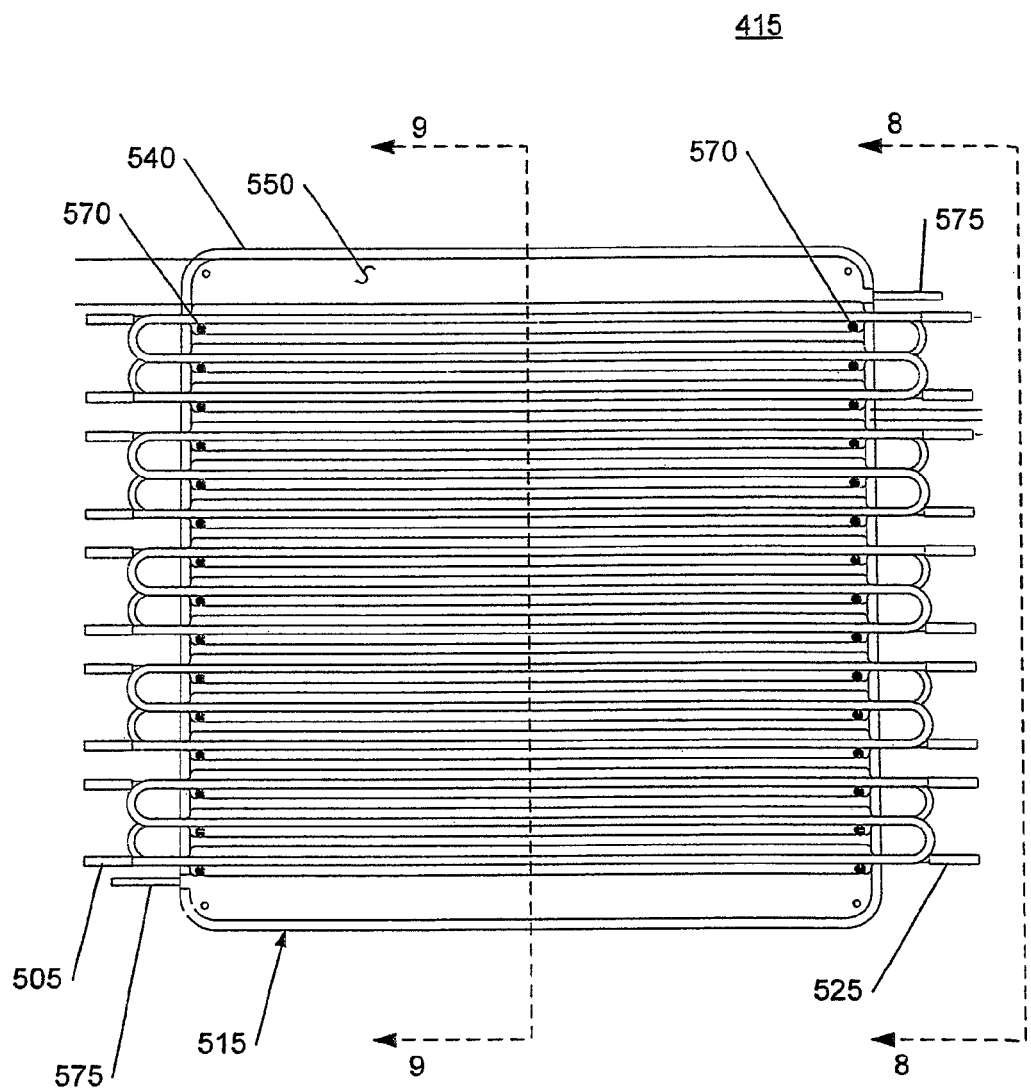
FIG. 7 is a side plan view of the condensing unit of FIG. 5 showing the side that receives a condenser.
Figure 8:
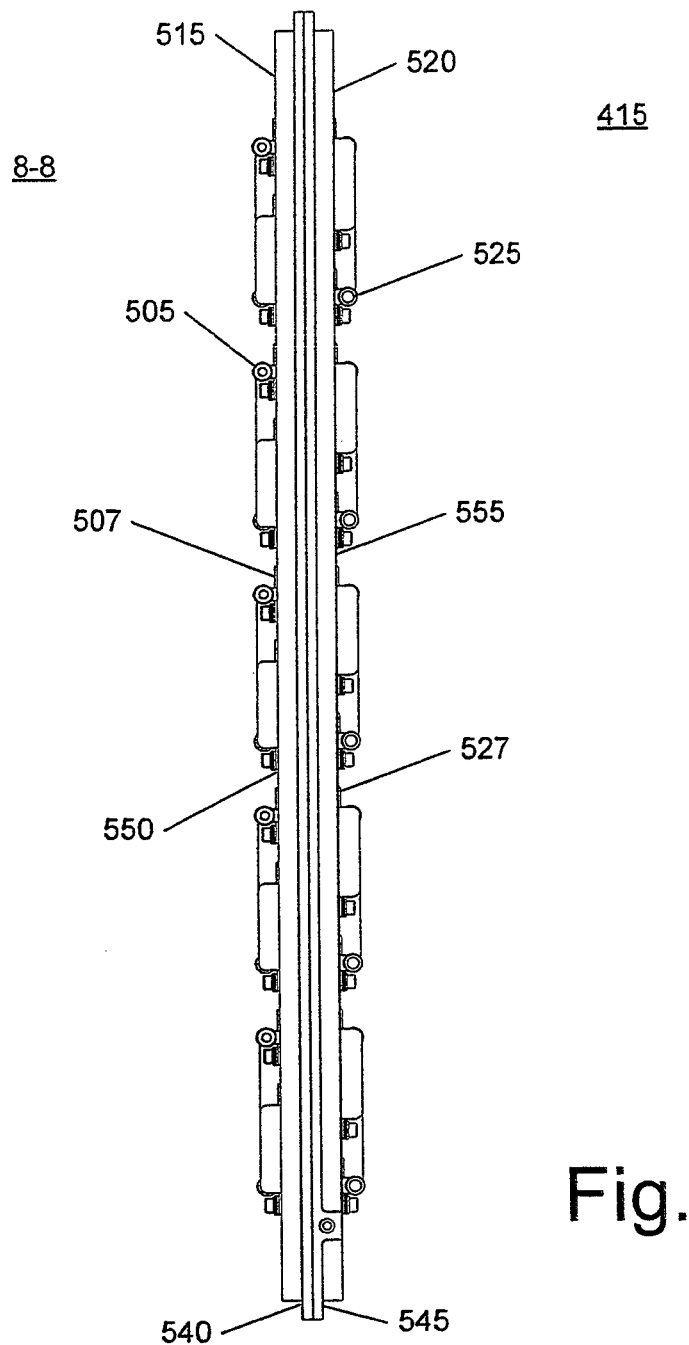
FIG. 8 is a side plan view of the condensing unit of FIG. 5 taken along section line 8-8 of FIG. 7.

Referring to FIG. 4, a two-phase heat transfer system 400 includes a condensing unit 415 that includes a thermal capacitance device integrated with a condenser. The condensing unit 415 replaces the sole condenser 315 that is shown in the heat transfer system 300 above (FIG. 3A). Like the heat transfer system 300 above, the heat transfer system 400 thermally transports heat from a heat source 405 using the capillary pressure developed in a wick of a fine pore evaporator 410 to circulate a working fluid within a closed loop. In some applications, such as those applications involving spacecraft, the temporal heat sources are located remotely from the cooling sink. In these cases, heat transport can be efficiently accomplished with a single-evaporator or a multi-evaporator two-phase heat transfer system. To enable the load-leveling benefits of a thermal capacitance device to be afforded to all temporally varying heat sources serviced by the (single- or multi-evaporator) two-phase heat transfer system, the thermal capacitance device is therefore thermally linked to the condenser of the two-phase heat transfer system to form the two-phase heat transfer system 400.

The heat transfer system 400 includes a heat sink 420 thermally coupled to the condensing unit 415, a fluid reservoir 425, a vapor line 430 from the evaporator 410 to the condensing unit 415, a liquid line 435 from the condensing unit 415 to the evaporator 410, and a sweepage line 440 from the evaporator 410 to the reservoir 425. The fluid reservoir 425 is in fluid communication with the vapor line 430 by way of a reservoir line 427. The fluid reservoir 425 may be cold biased by a thermal connection 429 with the condensing unit 415.

In operation, heat is acquired at the heat source 405 through evaporation within the evaporator 410, vapor from the evaporator 410 flows through the vapor line 430 to the condensing unit 415, where the heat is rejected through condensation of the vapor into condensed liquid. The condensed liquid flows through the liquid line 435 to the evaporator 410, where it is available for evaporation. Moreover, vapor and/or bubbles of non-condensable gas (NCG bubbles) can be vented from a core of the evaporator 410 through the sweepage line 440 and into the reservoir 425. Additional fluid, as needed, can be pulled from the reservoir 425 through the reservoir line 427 and into the condensing unit 415.

The condensing unit 415 is designed in a thermally efficient manner. Thus, the thermal capacitance device and the condenser within the condensing unit 415 are in an integral assembly, as discussed below with respect to FIGS. 5-10. Moreover, to achieve an integral assembly, the thermal capacitance device and the condenser are designed to be geometrically and thermally compatible to reduce thermal resistance between the thermal capacitance device and the condenser. The thermal capacitance device is constructed in a manner that facilitates or enables attachment of the condenser lines (or tubing) of the condenser to the thermal capacitance device while maintaining the heat transfer between the thermal capacitance device and the condenser.

Referring to FIGS. 5-10, the condensing unit 415 includes a thermal storage unit (TSU) 500 and condenser lines 505 thermally coupled to and integral with the thermal storage unit 500. The TSU 500 is constructed with a core 510 sandwiched between two pan-shaped end pieces 515, 520.

The end piece 515 thermally couples to the condenser lines 505, while the end piece 520 acts a cold side of the TSU 500 and thermally couples to the heat sink 420. The condenser lines 505 can be made of, for example, an aluminum extrusion that includes a thin flange 507 that has a flat surface that mates with the end piece 515. As shown, the heat sink 420 is designed as lines of chilled fluid 525 that are thermally coupled to the end piece 520. The chilled fluid lines 525 can be made of, for example, aluminum extrusion that includes a thin flange 527 that has a flat surface that mates with the end piece 520.

Figure 9:
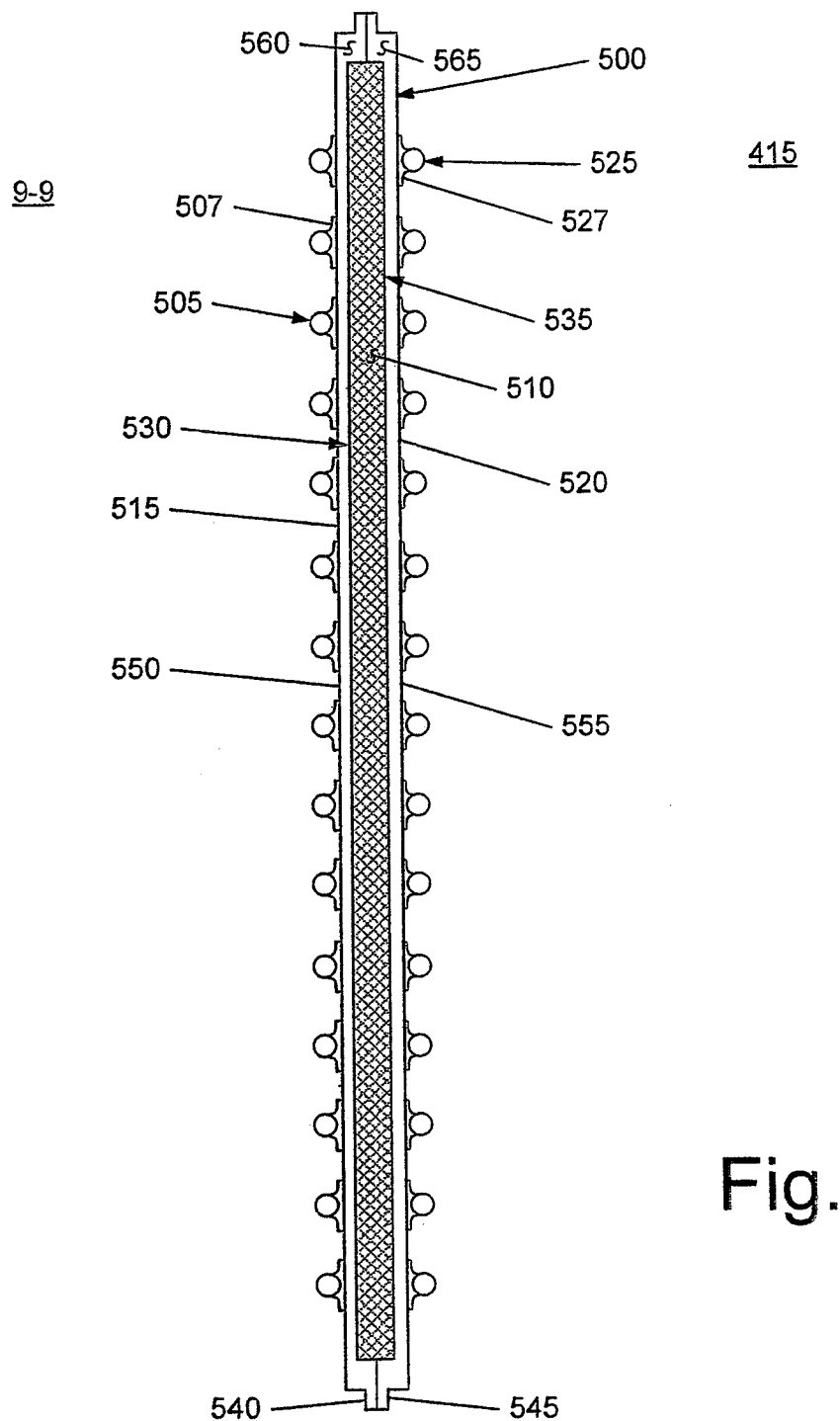
FIG. 9 is a cross-sectional view of the condensing unit of FIG. 5 taken along section line 9-9 of FIG. 7.
Figure 10:
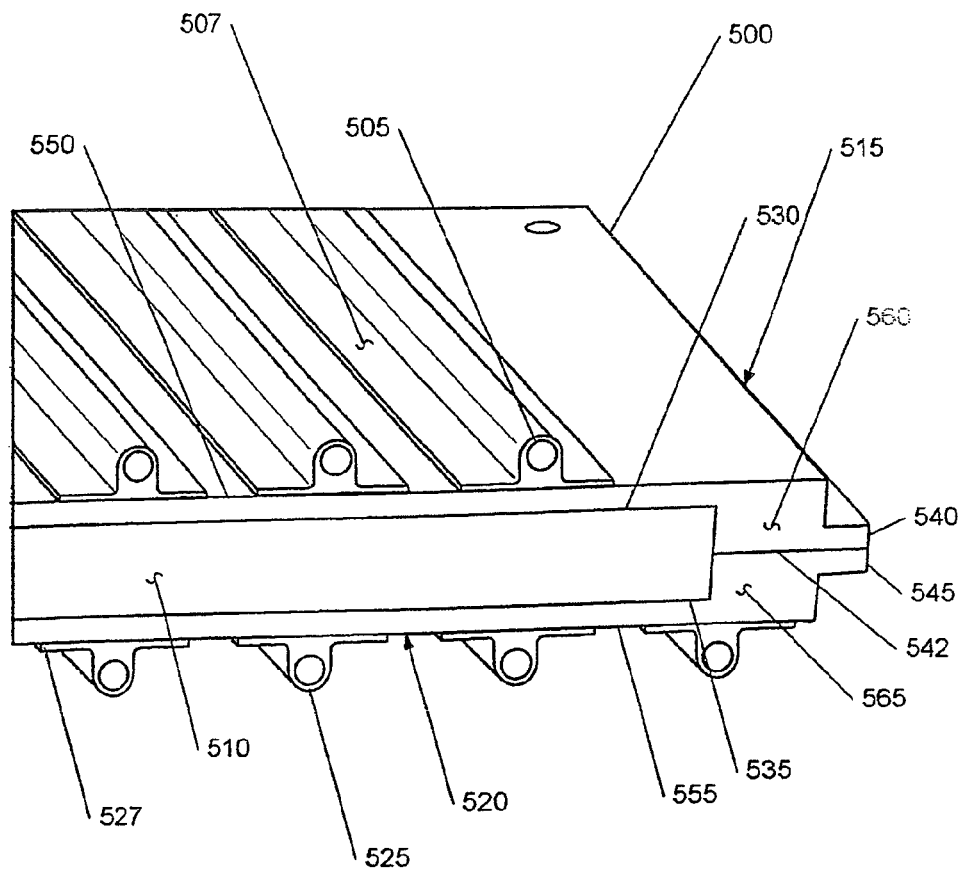
FIG. 10 is a cutaway perspective view of a portion of the condensing unit of FIG. 5.

Each end piece 515, 520 respectively includes a base 550, 555, and thick walled section 560, 565 (as shown in FIGS. 9 and 10) directly surrounding the periphery of the base 550, 555. Each end piece 515, 520 respectively includes a peripheral flange 540, 545 that wraps around a periphery of the base 550, 555 of the end piece 515, 520. The peripheral flanges 540, 545 extend from the base 550, 555 such that when the end pieces 515, 520 are mated, the flanges 540, 545 touch along an interface 542, and the core 510 is held between the bases 550, 555 and inside the thick walled sections 560, 565.

Each end piece 515, 520 also includes fasteners 570 that are inserted through the thick walled sections 560, 565, respectively, to ensure the condenser lines 505 and the chilled fluid lines 525, which are each bonded on the respective bases 550, 555 of the condensing unit 415, do not delaminate. The fasteners 570 are shown as screws that are inserted into throughholes of the flanges 507, 527 and into the thick walled sections 560, 565 of the end pieces 515, 520.

In one implementation, the core 510 is made of a honeycomb structure that includes channels elongated along a core axis, where each channel has a honeycomb (hexagonal cross-section) geometry taken along a section that is perpendicular to the core axis. The PCM is received within the channels. In other instances of this implementation, the channels have an effective cross-sectional size (or width) of less than or equal to about 0.1". The honeycomb structure of the core 510 can be partially to fully expanded prior to installation of the core 510 within the end pieces 515, 520. Thus, the geometry of the honeycomb structure of the core 510 can be expanded to a particular density prior to installation within the end pieces 515, 520. The particular density of the honeycomb structure should be high enough so that the thermal resistance between the core 510 and the PCM that fills the core 510 is reduced or minimized. In one implementation, the honeycomb structure is partially expanded within the core 510, such that the width of the channel in the partially expanded honeycomb structure is about one-fifth of the width of a channel in a fully expanded honeycomb structure and such that the channel relative density is about five times the density of a fully expanded honeycomb structure and about 10% of the density of a fully solid core.

The core 510 is made of a material that is thermally conductive (for example, having a thermal conductivity greater than about 100 W/mK) to provide for a suitable transfer of heat between the end pieces 515, 520 and the core 510. The core 510 is made from a material that is relatively lightweight (for example, having a density less than about 5000 kg/m$^3$), that is machinable, that has moderate strength and durability to withstand the volume change of the PCM during a phase change, and that is able to be attached to the end pieces 515, 520. For example, the core 510 may be made of aluminum, copper, beryllium, molybdenum, beryllium copper, graphite, graphite foam, aluminum nitride, aluminum carbide, beryllium oxide, magnesium, tungsten, silver, gold, and zinc.

The end pieces 515, 520 are made of material that is thermally conductive (for example, having a thermal conductivity greater than about 100 W/mK) to provide for a suitable transfer of heat between the end pieces 515, 520 and the condenser lines 505 or the radiator 420 and the end pieces 515, 520 and the core 510. The end pieces 515, 520 are made from a material that is relatively lightweight (for example, having a density less than about 5000 kg/m$^3$), that is machinable, that is sealable (for example, to the core 510 or to the condenser lines 505 or the radiator 420), and that has moderate strength and durability to withstand possible pressure changes. For example, the end pieces 515, 520 may be made of aluminum, copper, beryllium, molybdenum, beryllium copper, graphite, aluminum nitride, aluminum carbide, beryllium oxide, magnesium, tungsten, and zinc.

The use of the thermal capacitance device within the condensing unit reduces temperature fluctuations in a temperature-sensitive system that is subjected to temporally varying heat loads. The use of the thermal capacitance device, whether used in a stand-alone application or in conjunction with a two-phase heat transfer system reduces the need for larger heat rejection subsystems (radiators).

The two-phase heat transfer system that includes a thermal capacitance condensing unit can be better able (without increasing cooling system size/weight) to reduce the temperature fluctuations of temperature-sensitive and two-phase heat transfer system cooled components and systems subjected to temporally varying heat loads. Additionally, the condensing unit has good heat load scalability. In general, integrating the functionalities of a thermal capacitance device with a condenser of a two-phase heat transfer system results in a smaller-sized system and a compact heat rejection subsystem (radiator) sized for an average rather than a peak heat load. Thus, size requirements of the two-phase heat transfer system can be reduced, and the temperature fluctuation of the heat source can be reduced.

Figure 11:
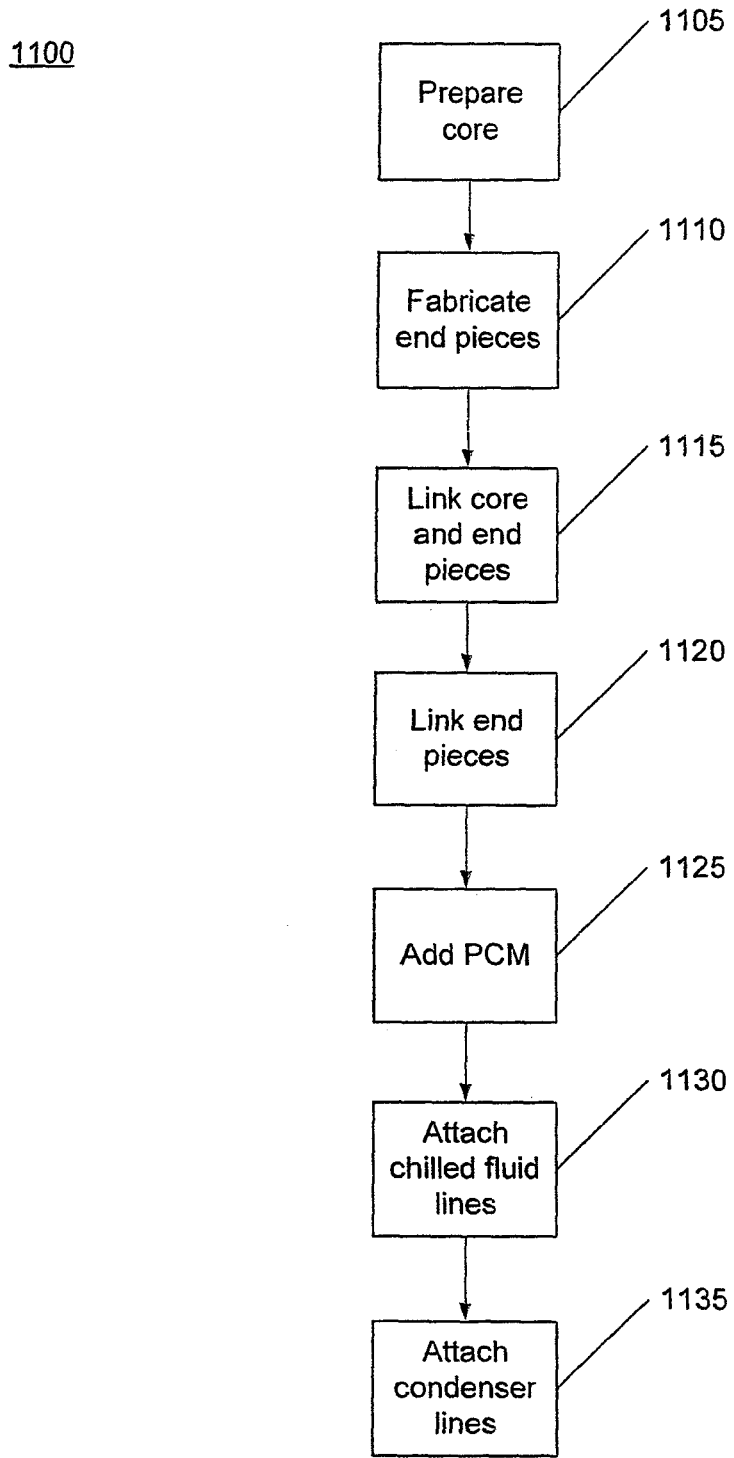
FIG. 11 is a flow chart of a procedure for manufacturing the condensing unit of FIG. 5.

Referring to FIG. 11, the condensing unit 415 is manufactured according to a process 1100. Initially, the core 510 is prepared (step 1105). The core 510 can be prepared by purchasing a pre-fabricated core from Alcore, Inc. of Lakeside Business Park, 1502 Quarry Drive, Edgewood, Md. 21040 USA. Such cores can be found at Alcore's website at www.alcore.com. Next, the pre-fabricated core 510 is expanded to a size suitable for a requisite density and strength for joining with the end pieces 515, 520.

The end pieces 515, 520 are also fabricated (step 1110). The end pieces 515, 520 can be fabricated by machining a block of material into the appropriate shape to form the peripheral flanges 540, 545 and the bases 550, 555, respectively.

Next, the core 510 is thermally linked to the two end pieces 515, 520 at, respectively, interfaces 530, 535 (shown in FIGS. 9 and 10) (step 1115). The core 510 can be linked to the two end pieces 515, 520 using any process that enables efficient transfer of heat between the core 510 and the end pieces 515, 520. For example, the core 510 can be glued to the end pieces 515, 520, or the core 510 can be pressed between the end pieces 515, 520.

Figure 12:
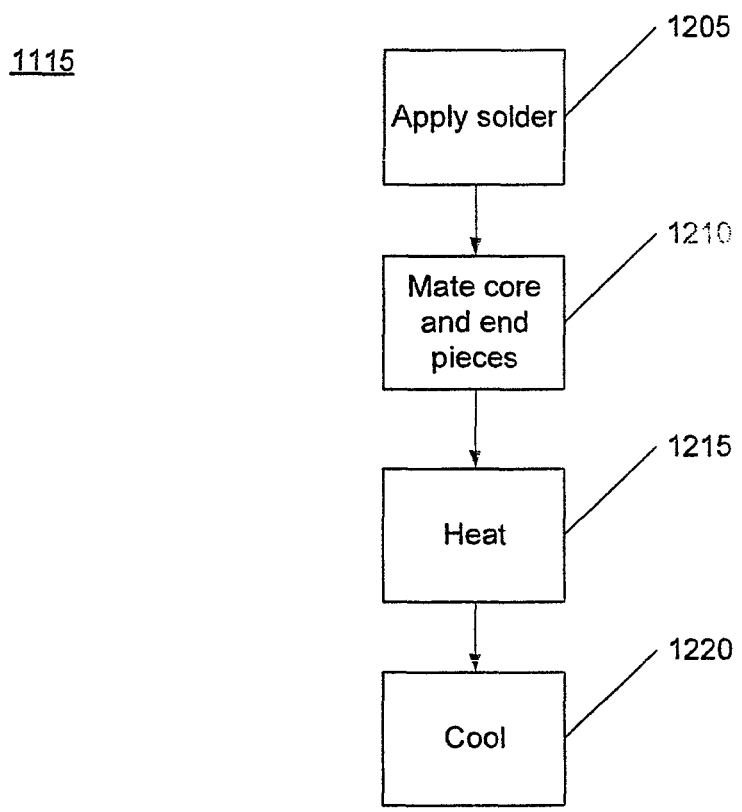
FIG. 12 is a flow chart of a procedure for linking a core to end pieces of the condensing unit of FIG. 5.

In one implementation, the core 510 is thermally linked to the end pieces 515, 520 using a metallurgical bonding process. Referring to FIG. 12, a procedure 1115 is performed to thermally link the core 510 to the end pieces 515, 520 using the metallurgical bonding process. The metallurgical bonding process described herein provides good thermal conductivity between the core 510 and the end pieces 515, 520. Solder is applied to each of the inner surfaces of the end pieces 515, 520 (at the inner surfaces that form the interfaces 530, 535) (step 1205). Solder is applied without the use of flux and without the need to surface treat the seam. The core 510 and both of the end pieces 515, 520 are mated together to form a seam at the interfaces 530, 535 (step 1210). Next, the core 510 and the end pieces 515, 520 are heated to a high enough temperature to melt the solder (step 1215) to enable the solder to bond the core 510 to the end pieces 515, 520. The solder has a high enough surface tension such that the solder does not stick to the core 510 during heating. In particular, the surface tension of the solder is high enough to prevent the channels within the honeycomb core 510 from becoming filled with the solder during heating. Furthermore, the metallurgical bonding process uses a solder that has a high thermal conductivity to provide for suitable thermal conductivity between the core 510 and the end pieces 515, 520. In one implementation, the end pieces 515, 520 are heated simultaneously to melt the solder applied to both of the inner surfaces so that the bond can be formed simultaneously at both interfaces 530, 535. Next, after the solder is sufficiently heated, the heat is removed and the core 510 and the end pieces 515, 520 are permitted to cool (step 1220).

In one implementation, the metallurgical bonding process includes an S-BOND® process, which is implemented by S-Bond Technologies of 811 W. Fifth Street, Lansdale, Pa. 19446. More information on the S-BOND® process can be found at http://www.s-bond.com/s-bond/sbond.htm or from S-Bond Technologies. The S-BOND® process is described in U.S. Pat. No. 6,047,876, issued Apr. 11, 2000, which is incorporated herein by reference.

The end pieces 515, 520 and the core 510 are designed such that after the metallurgical bonding process, the mating peripheral flanges 540, 545 on, respectively, the two end pieces 515, 520 are close enough such that the flanges 540, 545 can be attached to each other.

Thus, after the core 510 is thermally linked to the end pieces 515, 520, the flanges 540, 545 are attached to join the end pieces 515, 520 together (step 1120). In particular, the flanges 540, 545 can be attached by seal-welding the flanges 540, 545. In another implementation, the flanges 540, 545 can be attached by diffusion bonding, or welding or brazing with or without the use of a filler metal or an adhesive. In a further implementation, the flanges 540, 545 can be attached using a hot isostatic pressure bond method, as described in U.S. Pat. No. 6,264,095, issued on Jul. 24, 2001, which is incorporated herein by reference in its entirety. In one implementation, the flanges 540, 545 can be attached by screwing the thick walled sections 560, 565 down at each end using additional external clamping hardware to clamp the flanges 540, 545 together.

After the flanges 540, 545 are attached (step 1120), the PCM is added to the core 510 to fill the void volume within the honeycomb structure of the core 510 (step 1125). The PCM may be added using any standard fill process through one or more tubes 575 that are coupled to opening along sides of the end piece 515, 520. The opening can be located at one of the sides of the end piece 515, 520 through which the core axis passes so that the PCM can more easily flow into all of the channels (hexagonally shaped cells) of the core 510.

Next, the chilled fluid lines 525 are attached to the outer surface of the end piece 520 (step 1130). The fluid lines 525 can be attached using, for example, glue, epoxy, or any suitable film adhesive, or by brazing or soldering. The condenser lines 505 are attached to the outer surface of the end pieces 515 (step 1135). The condenser lines 505 can be attached using, for example, glue, epoxy, or any suitable film adhesive, or by brazing or soldering.

The condensing unit 415 reduces the temperature fluctuation of a temperature-sensitive component subjected to a temporally varying heat source 405, and minimizes the size and weight of the two-phase heat transfer system 400. For a temperature-sensitive heat source subjected to a temporal heat load, one typical heat load profile of the condensing unit 415 is a peak heat load of $Q_{MAX}$, which lasts for 10% of the recurring period, a minimum heat load of $Q_{MAX}/9$, which lasts for the remaining 90% of the recurring period. For such a typical duty cycle; the average heat load is about $Q_{MAX}/5$. An infinite number of alternate heat load profiles are possible.

The two-phase heat transfer system 400 can be used in pulsed high power and low duty cycle spacecraft instrument modules that are highly temperature sensitive. And, by virtue of the small footprint of the internal heat sources of these instrument modules, the pulsed high power and low duty cycle spacecraft instrument module is suited to an internal two-phase heat transfer system. The pulsed high power and low duty cycle spacecraft instrument module uses the two-phase heat transfer system 400 to prevent high peak loads from flowing into the spacecraft and to prevent excessive instrument module temperature fluctuations.

Other implementations are within the scope of the following claims.

For example, in another implementation, the TSU 100 can be a "sensible heat" TSU that changes temperature to store heat. In this implementation, the sensible heat TSU includes a solid mass of high heat capacity, thermally conductive material that changes temperature to store heat.

For a space application, the end piece 520 that is attached to the cold side of the TSU can be thermally coupled to a space-facing radiator 420.

Figure 13:
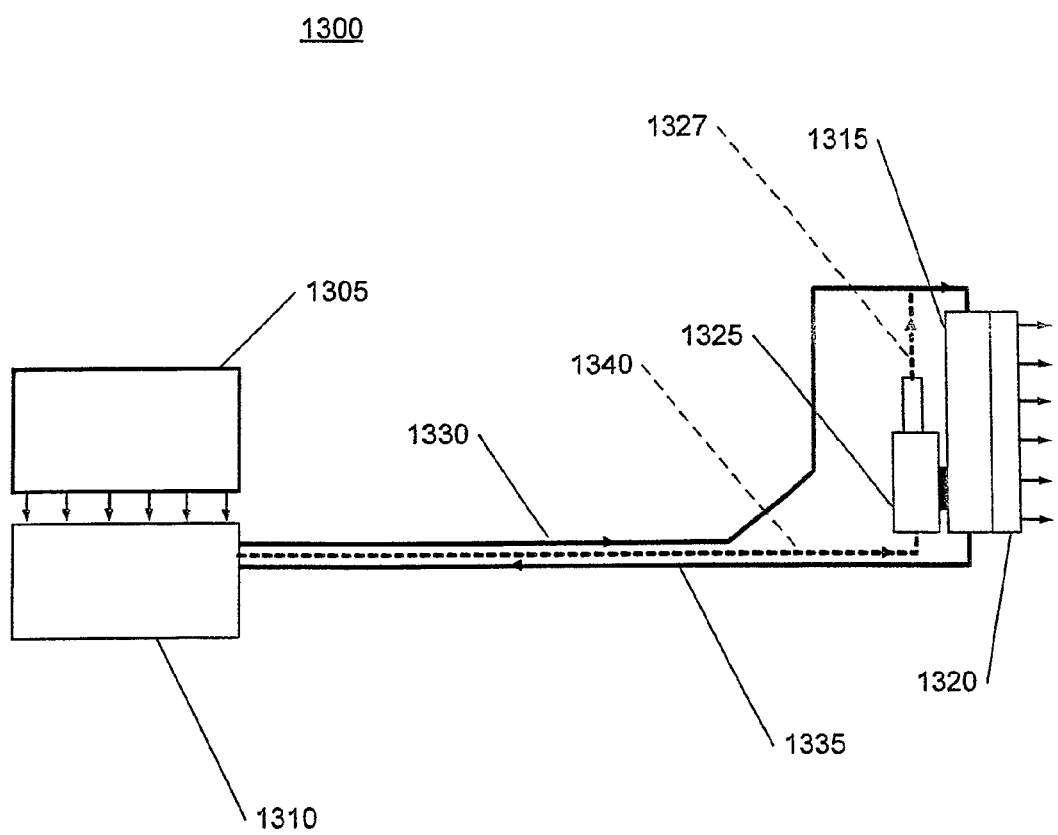
FIG. 13 is a schematic diagram of a two-phase heat transfer system including a thermal capacitance evaporating unit.

Referring to FIG. 13, a two-phase heat transfer system 1300 includes an evaporating unit 1310 that includes a thermal capacitance device integrated with an evaporator. The evaporating unit 1310 replaces the sole evaporator 310 that is shown in the system 300 above. Like the heat transfer system 300 above, the heat transfer system 1300 thermally transports heat from a heat source 1305 using the capillary pressure developed in a wick of a fine pore evaporator of the evaporating unit 1310 to circulate a working fluid within a closed loop. The heat transfer system 1300 includes a radiator 1320 thermally coupled to a condenser 1315, a fluid reservoir 1325, a vapor line 1330 from the evaporating unit 1310 to the condenser 1315, a liquid line 1335 from the condenser 1315 to the evaporating unit 1310, and a sweepage line 1340 from the evaporating unit 1310 to the reservoir 1325. The reservoir 1325 is coupled to the vapor line 1330 through a reservoir line 1327.

Figure 14:
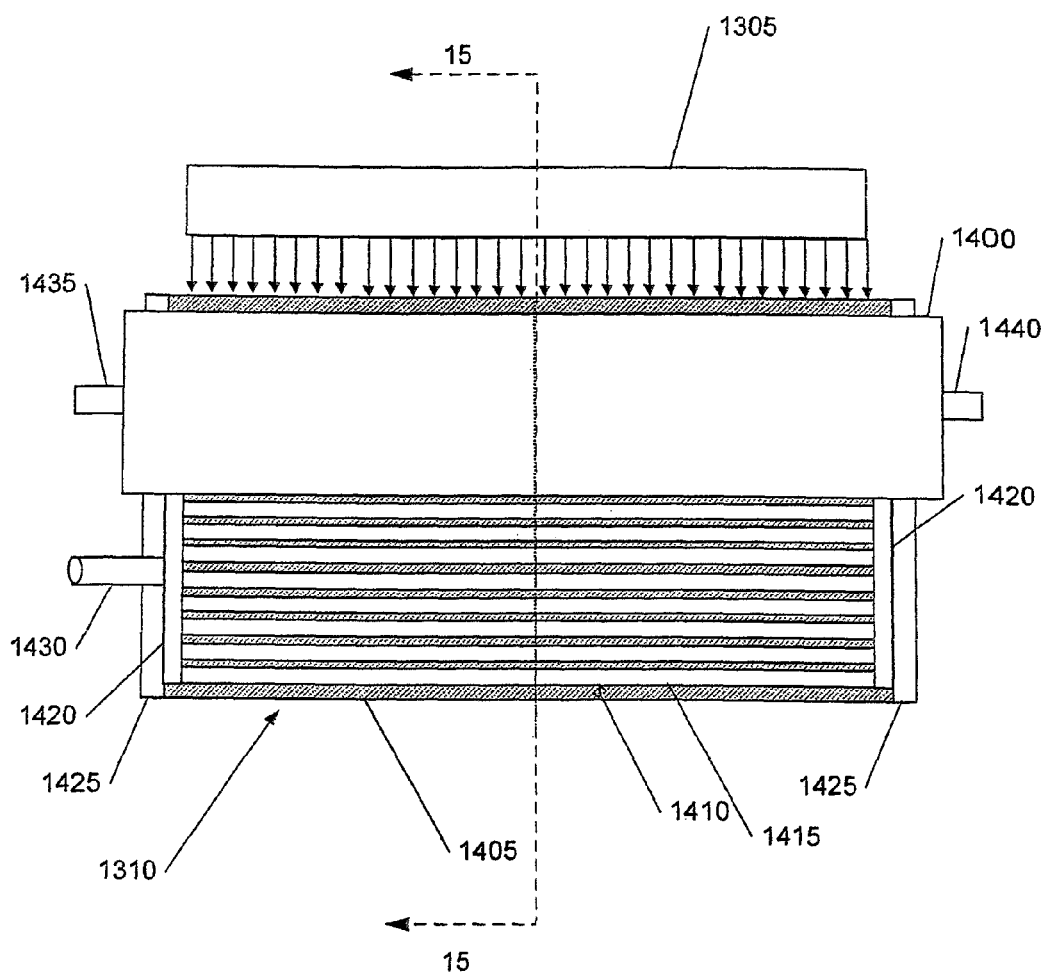
FIG. 14 is a center cross-sectional view of the evaporating unit of FIG. 13.
Figure 15:
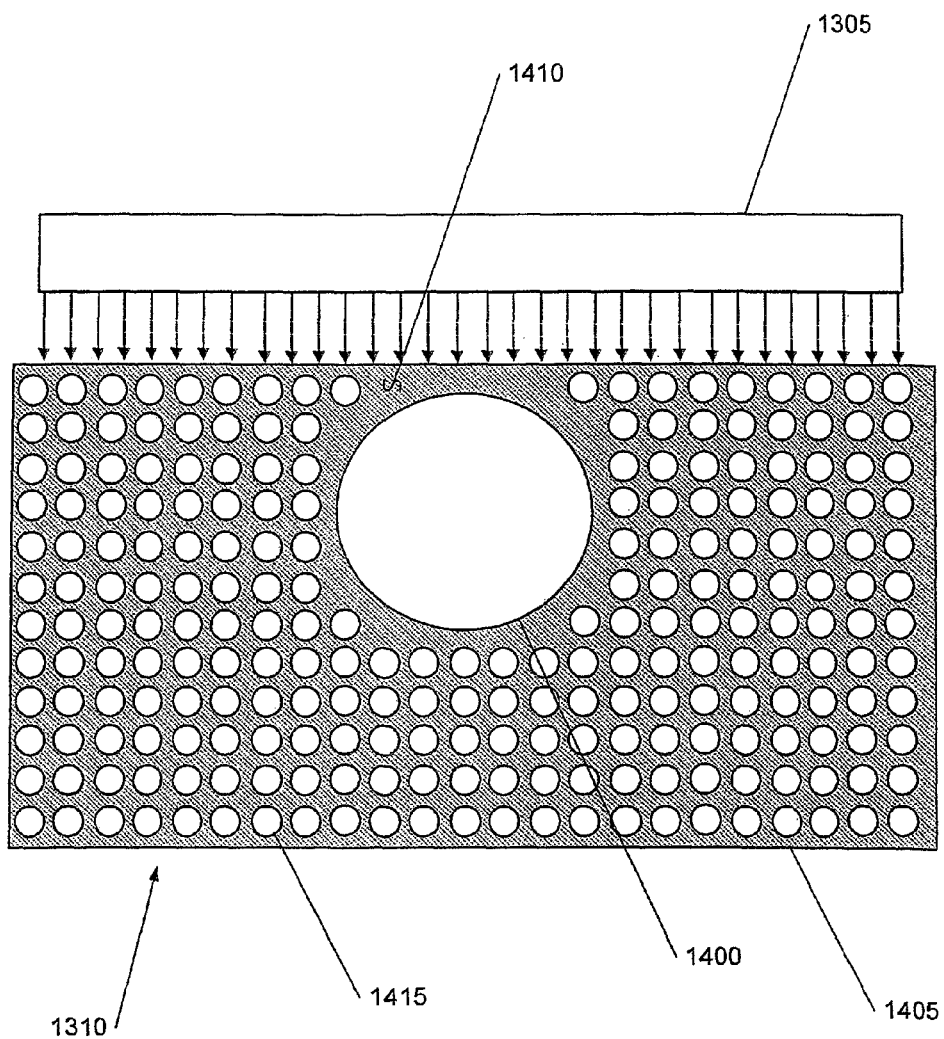
FIG. 15 is a cross-sectional view of the evaporating unit of FIG. 14 taken along section line 15-15 of FIG. 14.

Referring also to FIGS. 14 and 15, the evaporating unit 1310 is designed in a thermally efficient manner, in which the thermal capacitance device and the evaporator are in an integral assembly. Moreover, to achieve an integral assembly, the thermal capacitance device and the evaporator are designed to be geometrically and thermally compatible to reduce thermal resistance between the thermal capacitance device and the evaporator.

As shown, the evaporating unit 1310 includes an evaporator 1400 inside of a thermal capacitance device in the form of a thermal storage unit 1405. The thermal storage unit 1405 includes a block 1410 of material surrounding the evaporator 1400 and including a plurality of channels 1415. Each of the channels 1415 feeds into a plenum 1420 formed within and along at least one side of the block 1410. The thermal storage unit 1405 includes an end cap 1425 that thermally bonds with the block 1410 and fluidly seals the plenum 1420 and the channels 1415. The thermal storage unit 1405 includes at least one fill port 1430 that feeds into the plenum 1420. The fill port 1430 is attached to the end cap 1425 by an appropriate method, such as, for example, brazing or welding, to ensure a seal between the fill port 1430 and the end cap 1425. The fill port 1430 can be hermetically sealed off by an appropriate method, such as, for example, pinching or welding. The evaporating unit 1310 also includes ports that feed into and out of the evaporator 1400, including, for example, a liquid inlet 1435 that feeds into the evaporator 1400 and a vapor outlet 1440 that feeds out of the evaporator 1400.

The block 1410 is made of a thermally conductive material to enable transfer of heat throughout the block 1410. For example, the material of the block 1410 has a thermal conductivity greater than about 100 W/mK to provide for a suitable transfer of heat between the block 1410 and the evaporator 1400 or the block 1410 and the PCM within the channels 1415. The block 1410 is made from a material that is relatively lightweight (for example, having a density less than about 5000 kg/m$^3$), that is machinable, that is sealable (for example, to the end caps 1425), and, that has moderate strength and durability to withstand possible pressure changes. For example, the block 1410 may be made of aluminum, copper, beryllium, molybdenum, beryllium copper, graphite, aluminum nitride, aluminum carbide, beryllium oxide, magnesium, tungsten, and zinc. The end caps 1425 are made of a material that is strong enough to withstand possible pressure changes, is relatively lightweight, and is sealable, for example, to the block 1410. For example, the end caps 1425 may be made of aluminum, copper, beryllium, molybdenum, beryllium copper, graphite, aluminum nitride, aluminum carbide, beryllium oxide, magnesium, tungsten, and zinc.

To prepare the evaporating unit 1310 for operation, the PCM is introduced into the thermal storage unit 1405 through the fill port 1430, such that the PCM that passes through the fill port 1430 enters the plenum 1420 and the channels 1415. The PCM is able to pass freely through the plenum 1420 and the channels 1415. Next, the ports attached to the evaporator 1400 are connected to the appropriate fluid lines of the heat transfer system 1300. For example, the liquid inlet 1435 is fluidly connected to the liquid line 1335 and the vapor outlet 1440 is fluidly connected to the vapor line 1330.

In operation, heat is acquired at the heat source 1305 through evaporation within the evaporator of the evaporating unit 1310, vapor from the evaporator 1400 flows through the vapor outlet 1440, through the vapor line 1330 to the condenser 1315, where the heat is rejected through condensation of the vapor into condensed liquid. The condensed liquid flows through the liquid line 1335, through the liquid inlet 1435, and into the evaporator 1400, where it is available for evaporation. Moreover, vapor and/or bubbles of non-condensable gas (NCG bubbles) are vented from a core of the evaporator 1400 within the evaporating unit 1310 through the sweepage line 1340 and into the reservoir 1325.

Figure 16:
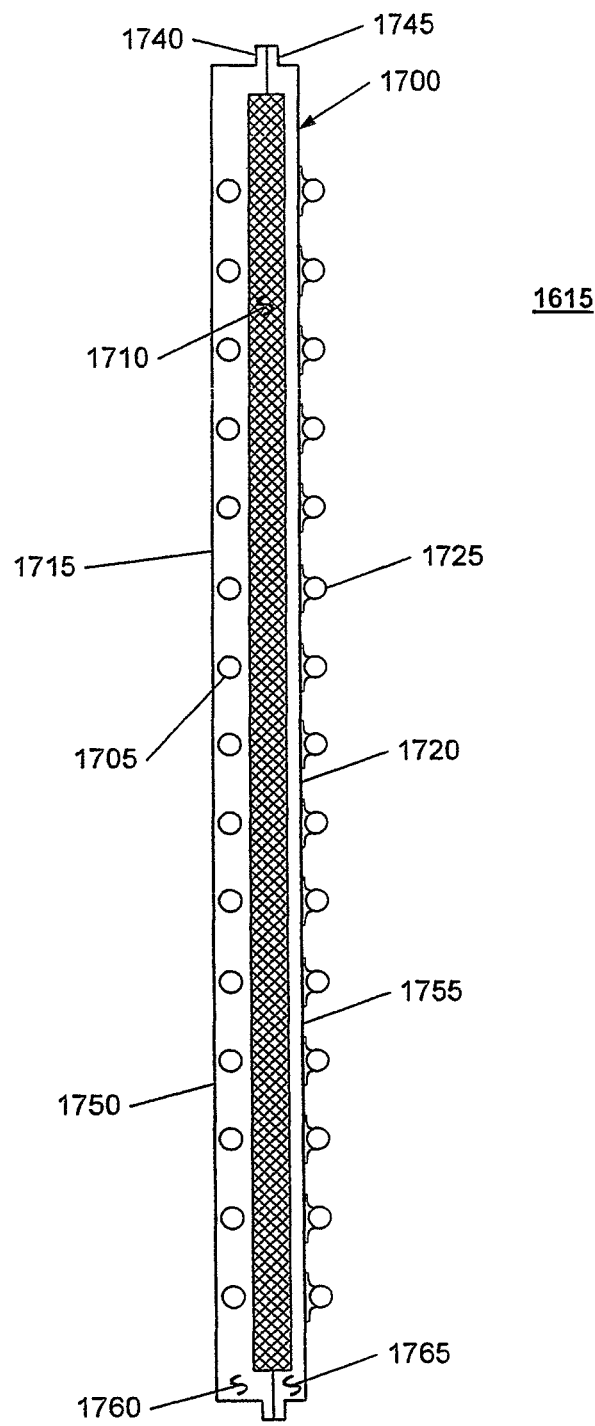
FIG. 16 is a cross-sectional view of another implementation of a condensing unit that can be used in the heat transfer system of FIG. 4.

Referring also to FIG. 16, in another implementation, the two-phase heat transfer system 400 can be designed with a condensing unit 1615 that includes a TSU 1700 integrated with a condenser 1705. In the condensing unit 1615, the condenser 1705 is provided as holes that are formed (for example, by machining) through an end piece 1715 of the condensing unit 1615. As shown in FIG. 16, an end piece 1720 is otherwise designed in a similar manner to the end piece 520 described above. In particular, the TSU 1700 includes a core 1710 that is sandwiched between the two pan-shaped end pieces 1715, 1720. Each end piece 1715, 1720 respectively includes a base 1750, 1755, and thick walled sections 1760, 1765 directly surrounding the periphery of the base 1750, 1755. Each end piece 1715, 1720 respectively includes a peripheral flange 1740, 1745 that wraps around a periphery of the base 1750, 1755 of the end piece 1715, 1720, much like the design of the flanges 540, 545 described above. Thus, the main difference between the condensing unit 1615 and the condensing unit 415 is the location of the condenser 1705. In the condensing unit 1615, the condenser 1705 is within the end piece 1715, while in the condensing unit 415, the condenser lines 505 are attached to an outer surface of the end piece 515. In both cases, there is a thermal connectivity between the PCM within the condenser 1705 or condenser lines 505 and the end piece 1715 or 515, respectively.

It is also or alternatively possible to design the end piece 1720 in a manner in which chilled fluid lines 1725 are inside of the end piece 1720 much like the condenser 1705 is designed within the end piece 1715.

What is claimed is:

1. A two-phase heat transfer system comprising:
   an evaporator configured to receive heat from a source;
   a liquid line fluidly connected to the evaporator;
   a vapor line fluidly connected to the evaporator; and
   a condensing unit fluidly connected to the liquid line and the vapor line, the condensing unit further comprising:
      a thermal capacitance device further comprising a thermal storage unit; and
      a condenser thermally coupled to a condenser side of the thermal capacitance device, the condenser further comprising:
         a vapor inlet fluidly connected to the vapor line;
         a liquid outlet fluidly connected to the liquid line; and
         a plurality of condenser lines fluidly connected to the vapor inlet and liquid outlet, wherein each condenser line of the plurality of condenser lines is directly coupled lenghtwise along an outer surface of the thermal capacitance device such that each condenser line is in direct contact with the outer surface of the thermal capacitance device.

2. The two-phase heat transfer system of claim 1, wherein the condensing unit includes a heat sink thermally connected to a heat sink side of the condenser.

3. The two-phase heat transfer system of claim 1, wherein the thermal storage unit includes a core that defines channels for receiving a phase change material.

4. The two-phase heat transfer system of claim 1, wherein the thermal storage unit includes at least one end piece that surrounds a core filled with phase change material.

5. The two-phase heat transfer system of claim 4, wherein the plurality of condenser lines is thermally attached to an outer surface of the at least one end piece.

6. The two-phase heat transfer system of claim 4, wherein the thermal storage unit includes a metallurgical bond between the core and the at least one end piece.

7. A two-phase heat transfer system comprising:
   an evaporator configured to receive heat from a source;
   a liquid line fluidly connected to the evaporator;
   a vapor line fluidly connected to the evaporator; and
   a condensing unit further comprising:
      a thermal capacitance device further comprising a thermal storage unit, the thermal storage unit further comprising:
         a honeycomb core; and
         two end pieces metallurgically bonded and thermally linked to the honeycomb core, wherein the two end pieces are bonded together to form around the honeycomb core; and
      a condenser thermally coupled to a condenser side of the thermal capacitance device, the condenser further comprising:
         a vapor inlet fluidly connected to the vapor line; and
         a liquid outlet fluidly connected to the liquid line.

8. The two-phase heat transfer system of claim 7, wherein the bond between the two end pieces comprises a seal weld provided on mating peripheral flanges of each of the two end pieces.

9. The two-phase heat transfer system of claim 7, further comprising a phase change material within the honeycomb core.

10. The two-phase heat transfer system of claim 7, wherein the two end pieces are bonded around a periphery of the two end pieces at a thick walled section of a peripheral flange of each of the two end pieces.

11. The two-phase heat transfer system of claim 7, wherein the bond between the two end pieces and the honeycomb core comprises a solder bond at a seam between the honeycomb core and one of the two end pieces and another seam between the honeycomb core and another of the two end pieces.

12. The two-phase heat transfer system of claim 7, further comprising a plurality of lines for conveying a chilled fluid coupled to one of the two end pieces.

13. The two-phase heat transfer system of claim 12, further comprising a plurality of condenser lines for conveying a heated fluid coupled to another of the two end pieces.

14. A two-phase heat transfer system comprising:
   an evaporator configured to receive heat from a source;
   a liquid line fluidly connected to the evaporator;
   a vapor line fluidly connected to the evaporator; and
   a condensing unit fluidly connected to the liquid line and the vapor line, the condensing unit further comprising:
      a thermal capacitance device further comprising a thermal storage unit having a core for holding a phase change material therein; and
      a condenser coupled to a condenser side of the thermal capacitance device, the condenser further comprising:
         a vapor inlet fluidly connected to the vapor line;
         a liquid outlet fluidly connected to the liquid line; and
         a plurality of condenser lines fluidly connected to the vapor inlet and liquid outlet, the plurality of condenser lines directly coupled lengthwise to an outer surface of the thermal storage unit external to the thermal storage unit, wherein each of the plurality of condenser lines extends along the outer surface of the thermal storage unit in direct contact with the outer surface of the thermal storage unit.

15. The two-phase heat transfer system of claim 14, wherein the core of the thermal storage unit comprises a plurality of elongated channels each extending through the core, each channel of the plurality of elongated channels configured to hold the phase change material.

16. The two-phase heat transfer system of claim 14, wherein the thermal storage unit further comprises two end pieces metallurgically bonded and thermally linked to the core, wherein the two end pieces are bonded together to form a seal for holding a phase change material within the core.

17. The two-phase heat transfer system of claim 14, wherein the thermal storage unit further comprises a heat sink thermally coupled to the condensing unit, the heat sink comprising a plurality of chilled fluid lines coupled to the outer surface of the thermal storage unit external to the thermal storage unit, the chilled fluid lines being separate from the plurality of condenser lines.

18. The two-phase heat transfer system of claim 17, wherein the plurality of condenser lines is coupled to the outer surface of the thermal storage unit on a first side of the thermal storage unit and the plurality of chilled fluid lines is coupled to the outer surface of the thermal storage unit on a second side of the thermal storage unit opposing the first side.

* * * * *

UNITED STATES PATENT AND TRADEMARK OFFICE
CERTIFICATE OF CORRECTION

| | | Page 1 of 1 |
|---|---|---|
| PATENT NO. | : 9,146,058 B2 | |
| APPLICATION NO. | : 13/022445 | |
| DATED | : September 29, 2015 | |
| INVENTOR(S) | : David C. Bugby, Edward J. Kroliczek and Jessica Maria Kester | |

It is certified that error appears in the above-identified patent and that said Letters Patent is hereby corrected as shown below:

In the specification:
    COLUMN 1,    LINE 18,    change "capitance" to --capacitance--

In the claims:
CLAIM 1,    COLUMN 11,    LINE 55,    change "coupled lenghtwise" to --coupled lengthwise--

Signed and Sealed this
Eighth Day of March, 2016

Michelle K. Lee
*Director of the United States Patent and Trademark Office*